Nov. 24, 1959　　　R. W. COLLIS　　　2,913,965
CLAMPING ASSEMBLY
Filed Dec. 8, 1958
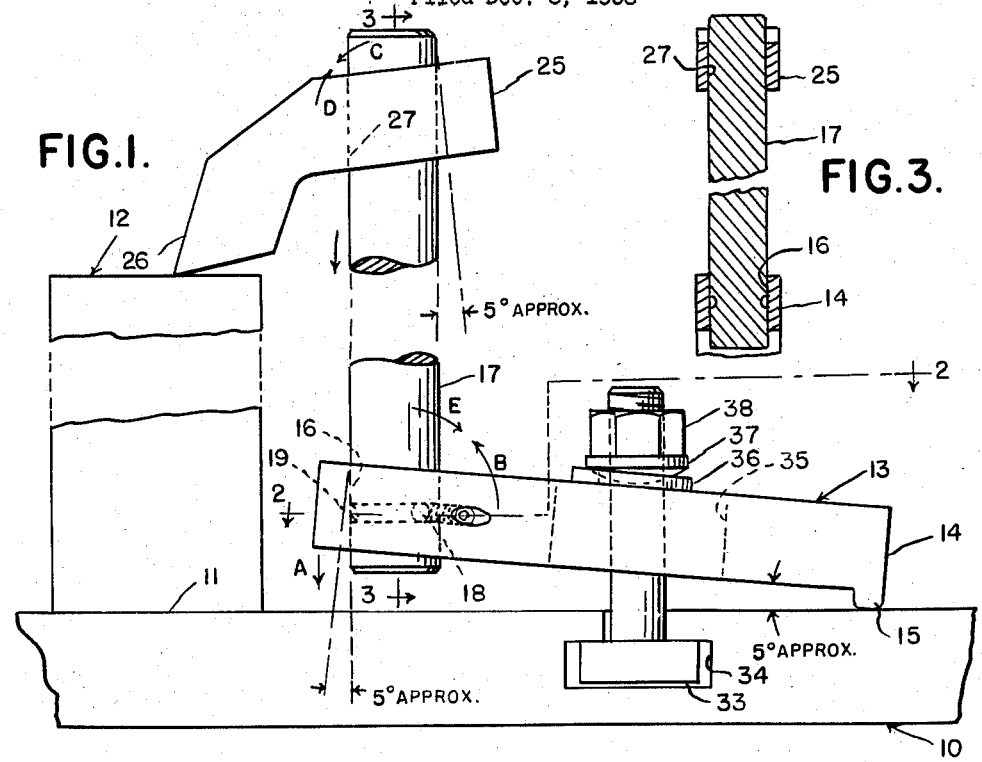
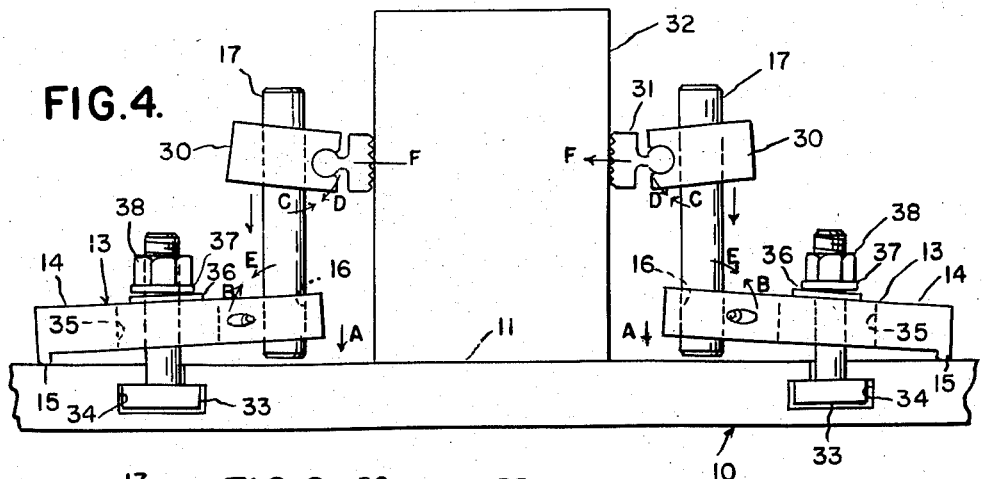
INVENTOR.
RALPH W. COLLIS
BY
Hauke + Hardesty
ATTORNEYS United States Patent Office 2,913,965
Patented Nov. 24, 1959

2,913,965
CLAMPING ASSEMBLY
Ralph W. Collis, Dearborn, Mich.
Application December 8, 1958, Serial No. 778,820
9 Claims. (Cl. 90—59)

My invention relates to clamps and more particularly to a clamp of the type operable to secure a workpiece on a work table.

Such clamps, as are particularly used by toolmakers, machinists and the like, heretofore have been such that, to provide for clamping of varying sizes of work, they require the stocking of a great variety of parts. In most cases it is found that a different clamp is required for almost every different job. The investment in clamps alone is generally a considerable portion of the cost of machines. Storage and safekeeping of whole sets of clamps is an ever present problem, but even more important to the worker and his employer is the lost time involved in changing clamps at every job changeover and the cost of lost parts. Moreover, experience has shown that existing clamps are subject to such large stresses that to avoid breakage or other damage, exceedingly heavy parts are required.

An object of the present invention is to facilitate the securing of a workpiece to a table by providing an improved self-contained clamp assembly.

Another object of the invention is to improve methods of clamping varying sizes of workpieces by providing a simplified standardized clamp set having a minimum number of total parts and a minimum number of parts needing to be replaced.

A further object of the invention is to improve clamp construction by providing a structure using only a few basic parts which automatically lock together on the application of the slightest clamping force.

Yet a further object of the invention is to eliminate the stocking of a great number of clamp parts by providing a simplified structure having single standard lever and tightening bolt parts adapted for operation with only a few extension rods and clamping heads to clamp the widest practical variety of workpieces.

For a more complete understanding of the invention, reference may be had to the accompanying drawing illustrating preferred embodiments of my invention in which like reference characters refer to like parts throughout the several views and in which—

Fig. 1 is a side view of one preferred modification of the clamp embodying my invention.

Fig. 2 is a half plan and half sectional view of the lever embodied in the invention as taken substantially on the line 2—2 of Fig. 1.

Fig. 3 is a cross-sectional view taken substantially on the line 3—3 of Fig. 1, and Fig. 4 is a side view of a second preferred modification of the invention.

In Figs. 1, 2 and 3 a table 10 or any suitable workbench or support is illustrated as preferably having a work surface 11 on which rests any type of workpiece 12 which needs to be clamped in position for performing whatever machining or other work is necessary.

A clamp assembly 13 is illustrated as comprising an elongated lever 14 having a fulcrum 15 preferably disposed at the end and resting on the table 10, the entire lever being raised and lowered with respect to the work surface 11 about the fulcrum 15 as is readily apparent. A hole 16 is preferably bored through the lever 14 as illustrated, being inclined at an angle, preferably of about 5 degrees, as shown with respect to the longitudinal axis of the lever 14 so that, when the lever 14 is raised to the position shown, the hole 16 is disposed substantially normal with respect to the work surface 11.

A solid rod 17 has one end slidably carried in the hole 16, fitting with a very small clearance, preferably of about .002 to .003 inch. If desired, the rod 17 may be held from sliding through the hole 16 by any suitable means such as a spring loaded ball 18 which engages with a peripheral groove 19 in the rod 17, as shown in Figs. 1 and 2. This ball mechanism serves no other purpose and the rod 17 is readily removed, the ball 18 providing no positive locking pressure against most forces.

A clamp element 25 is disposed on the rod 17 and as shown in Figs. 1 and 3, is provided with a downwardly-angled clamping jaw 26 which engages the top of the workpiece 12. The element 25 has a hole 27 which closely fits the rod 17, preferably with a clearance of about .002 to .003 inch, the hole 27 being at a slight angle, preferably of about 5 degrees, with respect to the longitudinal axis of the element 25. Thus it is seen that the lever 14 and the clamp element 25 are maintained by the rod 17 in a relative angular relation of about 10 degrees with respect to each other.

It will thus be apparent that, due to this angular position, any force tending to move the lever 14 in the counterclockwise direction, indicated by the arrow A, about the fulcrum 15, will tend to tilt the rod 17 toward the workpiece 12 by applying an arcuate force indicated by the arrow B. The rod 17 consequently applies an arcuate force, indicated by the arrow C, to the clamping element 25. However, the workpiece 12, engaged by the jaw 26 and supported on the work surface 11, resists movement of the clamp element 25, in effect applying a counter-force to the rod 17 as indicated by the arrow D. The result of the counterforce D is to lock or jam the element 25 against sliding movement on the rod 17, and due to the larger bearing area of the two parts, the locking engagement is found to be exceedingly effective.

The aforesaid counter-force is transmitted through the rod 17 and in similar manner, effects a counterforce against the lever, as indicated by the arrow E of Fig. 1. The rod 17 thus similarly locks or jams against sliding movement with respect to the lever 14.

In total effect, the lever 14, rod 17, and clamp element 25 become, for all practical purposes, a single rigid assembly at the first application of force on the lever 14. In fact, the weight of the lever 14 is generally sufficient. Any additional force applied on the lever 14 will act through the rod 17 and element 25 to apply clamping pressure on the workpiece 12, and the greater the pressure, the greater the counterforces locking the lever 14 and the element 25 on the rod 17.

In Fig. 4, a modification of the present invention is illustrated in which all parts are the same as in Fig. 1 except that a different clamping element 30 is illustrated as having a pivotally mounted jaw member 31 which, as shown, can act to apply a substantially lateral clamping force, indicated by the arrow F. It will be seen also that the locking counter-force D will depend on the angle of the jaw member 31 with respect to the element 30, but otherwise all forces will achieve the same result as that previously described. Fig. 4 illustrates how two such clamping assemblies may be utilized to hold a large workpiece 32.

The initial force applying means preferably comprises a T-bolt 33 retained in a slot 34 in the table 10 and extending upward through a preferably elongated slot 35 in the lever 14. Conventional concave-convex washers 36—37 are disposed on the bolt 33 to provide for the arcuate movement of the lever 14, and a nut 38 is screw-threaded on the T-bolt to bear on the washers 36—37 and, when tightened, to initiate the locking and clamping forces previously described. The use of the elongated slot permits of lateral adjustment of the lever 14 toward and away from the workpiece 12 or 32.

The lever 14, T-bolt 33, washers 36—37 and nut 38 are the same regardless of the clamping job. It is found that three lengths of rods 17 and the clamping elements 25 and 30 will be sufficient for handling practically any conventional workpiece 12 or 32, so that changeovers are readily accomplished and only a minimum number of parts need be stocked by any shop.

Although I have described only two preferred embodiments of my invention, it will be apparent to one skilled in the art to which the invention pertains that various changes and modifications may be made therein without departing from the spirit of the invention or the scope of the appended claims.

I claim:

1. A clamping assembly for clamping a workpiece on a work surface and comprising a support, a lever element having a fulcrum carried by said support, a rod element having one end removably slidably carried by said lever, a clamp element removably slidably carried by said rod and adapted to engage said workpiece, and means exerting a force on said lever about the fulcrum to thereby simultaneously lock both the lever element and the clamp element to said rod element against relative sliding movement, and to urge said clamp element in clamping engagement with said workpiece.

2. A clamping assembly for clamping a workpiece on a work surface and comprising a support, a lever element having a fulcrum carried by said support, a rod element having one end removably slidably carried by said lever, a clamp element removably slidably carried by said rod and adapted to engage said workpiece, and means exerting a force on said lever element about the fulcrum tending to rock said rod and urge said clamp element against said workpiece whereby reaction forces due to resistance to movement of said workpiece act on said clamp rod elements counter to the forces generated by said lever element, said counter reaction forces acting to lock both the lever element and the clamp element to said rod element against relative sliding movement, and further forces exerted on said lever element acting through said locked elements to exert clamping pressure on said clamp element.

3. A clamping assembly for clamping a workpiece on a work surface and comprising a support, a lever element having a fulcrum carried by said support, a rod element having one end removably slidably carried by said lever, a clamp element removably slidably carried by said rod, and adapted to engage said workpiece, said elements being arcuately operable as an assembly in a plane substantially normal to said work surface, and means exerting a force on said lever about said fulcrum tending to rock said elements toward said workpiece and urge said clamp element against said workpiece, whereby counter forces are transmitted through said elements due to resistance of said workpiece to motion of said clamp, said elements being constructed to lock against relative sliding movement upon the aforesaid transmission of said counter forces whereby further exertion of force on said lever acts to apply clamping pressure on said workpiece by said clamp element.

4. A clamping assembly for clamping a workpiece on a work surface and comprising a support, a lever element having a fulcrum carried by said support, a rod element having one end removably slidably carried by said lever, a clamp element removably slidably carried by said rod and adapted to engage said workpiece, and means exerting a force on said lever about the fulcrum to thereby simultaneously lock both the lever element and the clamp element to said rod element against relative sliding movement, and to urge said clamp element in clamping engagement with said workpiece, said lever element comprising an elongated block, said fulcrum element being on one end of said block, said block having a hole in the other end extending at an angle relative to the axis of said block, said angle being such that when said block is tilted about said fulcrum to form a relatively small angle with said work surface said hole then extends substantially normal with respect to said work surface, said rod being slidable in said hole and fitting closely on the diameter thereof, said clamp element having a hole therethrough, said rod extending through said clamp element hole and fitting closely on the diameter thereof, said clamp element extending laterally from said rod in a direction opposite from said fulcrum to engage said workpiece.

5. A clamping assembly for clamping a workpiece on a work surface and comprising a support, a lever element having a fulcrum carried by said support, a rod element having one end removably slidably carried by said lever, a clamp element removably slidably carried by said rod and adapted to engage said workpiece, and means exerting a force on said lever about the fulcrum to thereby simultaneously lock both the lever element and the clamp element to said rod element against relative sliding movement, and to urge said clamp element in clamping engagement with said workpiece, said lever element comprising an elongated block, said fulcrum being on one end of said block, said force exerting means comprising a member secured to said support and engaging said block intermediate said fulcrum and said rod, said member carrying means selectively operable to urge said block toward said work surface to exert the aforesaid force.

6. A clamping assembly for clamping a workpiece on a work surface and comprising a support, a lever element having a fulcrum carried by said support, a rod element having one end removably slidably carried by said lever, a clamp element removably slidably carried by said rod and adapted to engage said workpiece, and means exerting a force on said lever about the fulcrum to thereby simultaneously lock both the lever element and the clamp element to said rod element against relative sliding movement, and to urge said clamp element in clamping engagement with said workpiece, said lever element comprising an elongated block, said fulcrum being on one end of said block and said rod element being carried by the other end of said block, said force exerting means comprising a member secured to said support and engaging said block intermediate said fulcrum and said rod, said member carrying means selectively operable to urge said block toward said work surface to exert the aforesaid force, said block and said rod element being so connected that when the block is arcuately moved about the fulcrum to form a relatively small angle with respect to said work surface said rod will extend away from and substantially normal to said work surface, said clamp element being constructed to extend substantially laterally from said rod in a direction opposite to said lever and having a work engaging portion angled toward said work surface, whereby to exert clamping forces substantially toward said work surface on actuation of said lever.

7. A clamping assembly for clamping a workpiece on a work surface and comprising a support, a lever element having a fulcrum carried by said support, a rod element having one end removably slidably carried by said lever, a clamp element removably slidably carried by said rod and adapted to engage said workpiece, and means exerting a force on said lever about the fulcrum to thereby simultaneously lock both the lever element and the clamp element to said rod element against relative sliding movement, and to urge said clamp element in clamping engagement with said workpiece, said lever element comprising an elongated block, said fulcrum being on one end of said block and said rod element being carried by the other end of said block, said force exerting means comprising a member secured to said support and engaging said block intermediate said fulcrum and said rod, said member carrying means selectively operable to urge said block toward said work surface to exert the aforesaid force, said block and said rod element being so connected that when said block is arcuately moved about the fulcrum to form a relatively small angle with respect to said work surface, said rod will extend away from and substantially normal to said work surface, said clamp element being constructed to extend substantially laterally from said rod in a direction opposite to said lever and having a work engaging portion facing in a direction substantially parallel with said work surface, whereby to exert clamping forces substantially parallel with said work surface on actuation of said lever.

8. A clamping assembly for clamping a workpiece on a work surface and comprising a support, a lever element having a fulcrum carried by said support, a rod element having one end removably slidably carried by said lever, a clamp element removably slidably carried by said rod and adapted to engage said workpiece, and means exerting a force on said lever about the fulcrum to thereby simultaneously lock both the lever element and the clamp element to said rod element against relative sliding movement, and to urge said clamp element in clamping engagement with said workpiece, said lever element comprising an elongated block, said fulcrum being on one end of said block and said rod element being carried by the other end of said block, said block having a slot intermediate said fulcrum and said rod element, a bolt secured to said support and extending through said slot, said force exerting means comprising a nut screw-threaded on said bolt and adapted to engage said block and exert the aforesaid forces upon urging said block toward said support.

9. A clamping assembly for clamping a workpiece on a work surface and comprising a support, a lever element having a fulcrum carried by said support, a rod element having one end removably slidably carried by said lever, a clamp element removably slidably carried by said rod and adapted to engage said workpiece, and means exerting a force on said lever about the fulcrum to thereby simultaneously lock both the lever element and the clamp element to said rod element against relative sliding movement and to urge said clamp element in clamping engagement with said workpiece, said lever element comprising an elongated block, said fulcrum being on one end of said block and said rod element being carried by the other end of said block, said block having a slot intermediate said fulcrum and said rod element, a bolt secured to said support and extending through said slot, said force exerting means comprising a nut screw-threaded on said bolt and adapted to engage said block and exert the aforesaid forces upon urging said block toward said support, said slot being elongated along the axis of said block to permit longitudinal adjustment of said block on said support relative to said bolt and nut.

References Cited in the file of this patent

UNITED STATES PATENTS

| | | |
|---|---|---|
| 2,285,148 | Czajka | June 2, 1942 |
| 2,322,707 | Wetzler | June 22, 1943 |